United States Patent [19]

Eftechiou

[11] Patent Number: 5,796,789

[45] Date of Patent: Aug. 18, 1998

[54] ALERTING DEVICE FOR TELEPHONES

[75] Inventor: Vakis Eftechiou, Mississauga, Canada

[73] Assignee: Omega Electronics Inc., Downsview, Canada

[21] Appl. No.: 779,314

[22] Filed: Jan. 6, 1997

[51] Int. Cl.[6] .......................... H04M 1/24; H04M 3/08; H04M 3/22

[52] U.S. Cl. ...................... 379/35; 379/7; 379/47; 379/27

[58] Field of Search ................... 379/1, 7, 24, 27, 379/30, 32–35, 47–48, 37, 42

[56] References Cited

U.S. PATENT DOCUMENTS

| | | |
|---|---|---|
| 2,269,141 | 1/1942 | Campbell . |
| 3,499,121 | 3/1970 | McIntosh et al. . |
| 3,514,544 | 5/1970 | Chambers, Jr. . |
| 3,786,501 | 1/1974 | Mamerakis ................... 379/47 |
| 4,000,376 | 12/1976 | Springer . |
| 4,051,333 | 9/1977 | Schomburg ................... 379/27 |
| 4,060,700 | 11/1977 | Magnusson . |
| 4,136,266 | 1/1979 | Cohen et al. . |
| 4,230,914 | 10/1980 | Korwin et al. . |
| 4,373,120 | 2/1983 | McDonald . |
| 4,434,328 | 2/1984 | Fields . |
| 4,443,665 | 4/1984 | Alderman . |
| 4,444,999 | 4/1984 | Sparrevohn . |
| 4,726,048 | 2/1988 | Waldman et al. . |
| 4,747,128 | 5/1988 | Chan et al. . |
| 4,805,210 | 2/1989 | Griffith, Jr. . |
| 4,807,278 | 2/1989 | Ross . |
| 4,809,317 | 2/1989 | Howe et al. . |
| 4,825,465 | 4/1989 | Ryan . |
| 4,941,166 | 7/1990 | Waldman et al. . |
| 4,969,178 | 11/1990 | Chen et al. ................... 379/27 |
| 5,231,658 | 7/1993 | Eftechiou . |
| 5,559,873 | 9/1996 | Wood et al. . |
| 5,696,810 | 12/1997 | Dunn ........................ 379/34 |

*Primary Examiner*—Curtis A. Kuntz
*Assistant Examiner*—Duc Nguyen
*Attorney, Agent, or Firm*—Barrigar & Moss

[57] ABSTRACT

A telephone alerting device for connection to a telephone line and a telephone. When the telephone is off-hook, the device will generate a visual and an audio alarm if an additional telephone connected to the same line also goes off-hook, thereby providing an eavesdropping alarm. The audio alarm is a periodic signal of short duration heard in the ear-pieces of all off-hook telephones connected to the telephone line. The device includes a voice path having a resistor placed in series with the telephone for raising the voltage across the telephone line when the telephone alone is off-hook. In order to trigger the alarm, the telephone must be off-hook and the voltage across the telephone line must be below a threshold value.

20 Claims, 4 Drawing Sheets

ALERTING DEVICE FOR TELEPHONES

BACKGROUND OF THE INVENTION

The present invention relates to telephone systems and particularly to a device for alerting a user of a phone device connected to a common telephone line when an additional telephone device is also connected to the same telephone line.

In many commercial and residential telephone installations there are a number of telephone line operated devices connected to one telephone line. In such installations, if someone is talking on one of the telephones, another party can pick up a second telephone and eavesdrop on the conversation without the first person being aware. Various devices have been proposed for solving this problem; however the existing devices have various technical or cost disadvantages. For example, U.S. Pat. No. 4,230,914 issued Oct. 28, 1980 to P. Korwin et al discloses a device for installation in the hand set of a telephone which provides a visual alarm when a subsequent telephone device on the same telephone line goes off-hook. However, the device disclosed in this patent requires an external power source in the form of a battery, and must be connected to the internal circuitry of the telephone, which makes it impractical.

U.S. Pat. No. 4,726,048 issued Feb. 16, 1988 to H. H. Waldman et al. discloses a telephone privacy circuit which cuts off the audio signal to a first off-hook telephone when a further telephone sharing the same telephone line is subsequently taken off-hook. Such a device is inconvenient as it cuts off the voice path to the first user off entirely when a second telephone is off-hook, thereby isolating the first user.

Various privacy devices have been proposed which include privacy circuits which must be connected to every telephone device connected to a common line. For example, U.S. Pat. No. 5,231,658 issued to V. Eftechiou discloses a privacy device which, when connected to every telephone device sharing a common line, ensures that once one telephone device is taken off-hook other telephone devices cannot then be activated. Although such a privacy device is useful, particularly when modems and fax machines are connected to the common line, the requirement that the device be attached to each telephone device on the common line increases costs. Additionally, the device can be overridden by disconnecting it from the telephone that is used by the eavesdropper.

Thus, it is desirable to have an eavesdropping alerting device for a telephone system which does not require an external source of power in addition to the telephone line, which only has to be connected to one telephone of interest, and which makes use of an audio alarm which can be heard in the ear piece of the off-hook telephone devices without cutting off the voice path.

BRIEF SUMMARY OF THE INVENTION

According to one aspect of the invention, an alerting device for connection to a telephone line and a telephone device is provided. The alerting device has a voice circuit for connection between the telephone line and the telephone device. The voice circuit includes a current limiting resistor for series connection between the telephone device and the telephone line. The alerting device also includes an alarm circuit for generating an alarm and a current monitoring circuit connected to the voice circuit for detecting the presence of current in the voice circuit. The current monitoring circuit is operatively connected to the alarm circuit for providing a first triggering signal to the alarm circuit when current is present in the voice circuit. The alerting device also has a voltage monitoring circuit for connection to the telephone line for detecting when the voltage across the telephone line drops below a threshold value. The voltage monitoring circuit is operatively connected to the alarm circuit for providing a second triggering signal to the alarm circuit when the voltage is below the threshold value. The alarm circuit will generate an alarm when it receives the first triggering signal and the second triggering signal simultaneously.

In a preferred embodiment, the threshold value is less than the voltage across the telephone line when the telephone device is off-hook and no other telephone devices connected to the telephone line are off-hook, and the threshold value is higher than the voltage across the telephone line when the telephone device is off-hook and at least one other telephone device connected to the telephone line is also off-hook.

According to another aspect of the invention, an alerting device for connection to a telephone line having tip and ring lines and a telephone device is provided, the alerting device having a voice circuit for connection between the telephone line and the telephone device, the voice circuit including indicating means for indicating when a current is passing through the voice circuit and current limiting means for limiting the current through the voice circuit. The alerting device also includes a monitoring circuit comprising telephone line monitoring means for detecting when the potential across the telephone line drops below a predetermined value; voice circuit monitoring means responsive to the indicating means for detecting when a current is passing through the voice circuit; and an alarm means for indicating an alarm when the line monitoring means detects that the potential is below the predetermined value and the voice circuit monitoring means detects that current is passing through the voice circuit. The alerting device also includes coupling means for coupling the monitoring circuit between the tip and ring lines.

According to a further aspect of the invention, an alerting device for connection to a telephone line and a telephone device is provided. The alerting device includes a voice circuit for connection between the telephone line and the telephone device and an alarm circuit for generating a signal on the telephone line that causes an audio sound to be generated by the ear-pieces of the telephone device and other off-hook telephone devices connected to the telephone line. A current monitoring circuit is connected to the voice circuit for detecting the presence of current in the voice circuit. The current monitoring circuit is operatively connected to the alarm circuit for providing a first triggering signal to the alarm circuit when current is present in the voice circuit. The alerting device includes a voltage monitoring circuit for connection to the telephone line for detecting when the voltage across the telephone line drops below a threshold level. The voltage monitoring circuit is operatively connected to the alarm circuit for providing a second triggering signal to the alarm circuit when the voltage is below the threshold. The alarm circuit will generate the signal only when it receives the first triggering signal and the second triggering signal simultaneously. Preferably, the circuit includes a low current blinking LED.

The present invention will be understood and appreciated more fully from the following detailed description, taken in conjunction with the accompanying drawings.

DETAILED DESCRIPTION OF THE INVENTION

Figure 1:
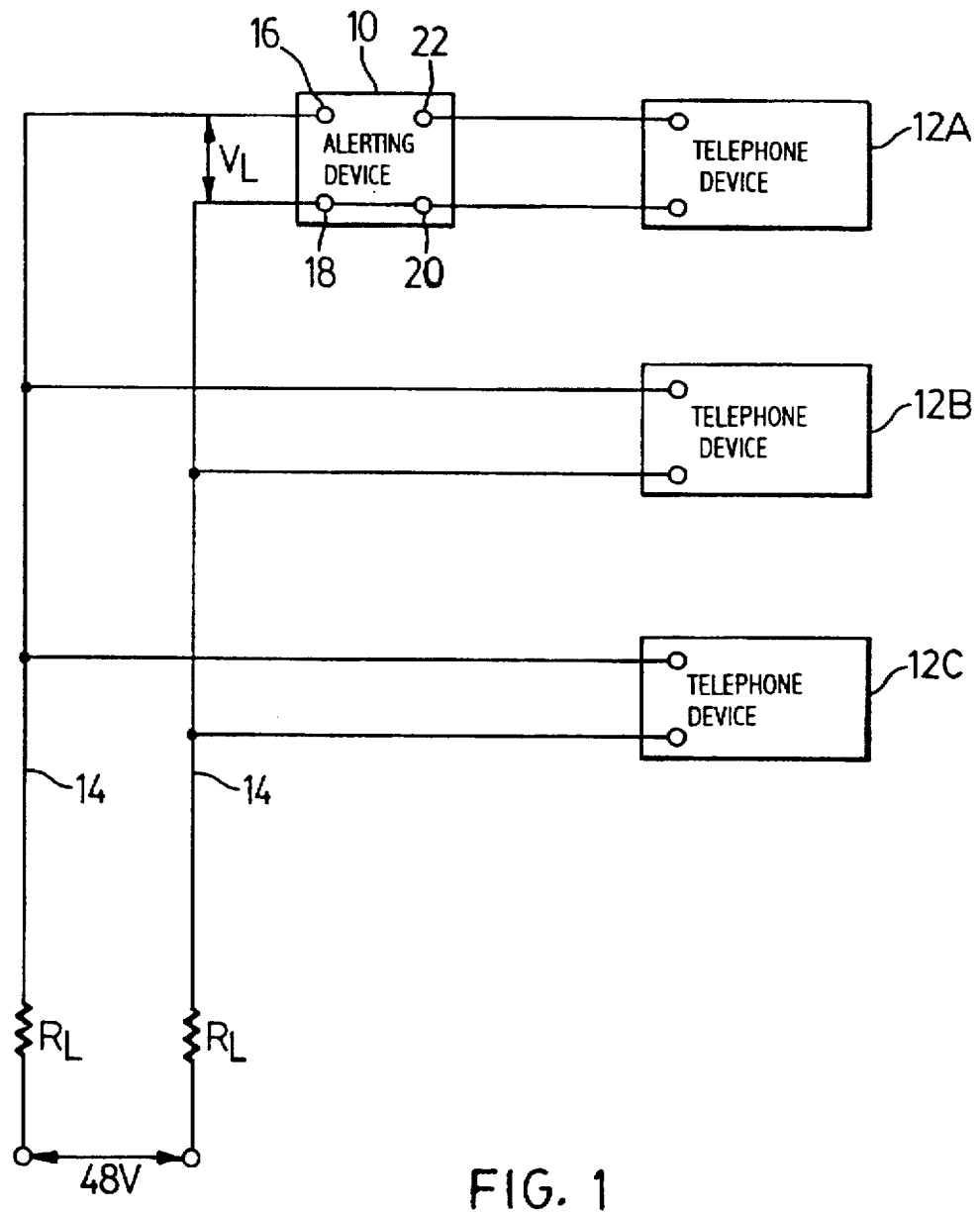
FIG. 1 is a block diagram of the alerting device of the present invention connected in a system of multiple telephone devices which are connected to a common telephone line.

FIG. 1 shows a telephone system in which a plurality of telephone devices 12A, 12B and 12C are attached through a common telephone line 14 to a telephone exchange (not shown). A telephone alerting device 10 of the present invention is coupled between the telephone 12A and the common telephone line 14.

The telephone line 14 is a conventional telephone line which includes tip and ring conductors which have inherent line impedances $R_L$. A DC potential of approximately 48 volts is applied across the telephone line at the telephone exchange.

Figure 2:
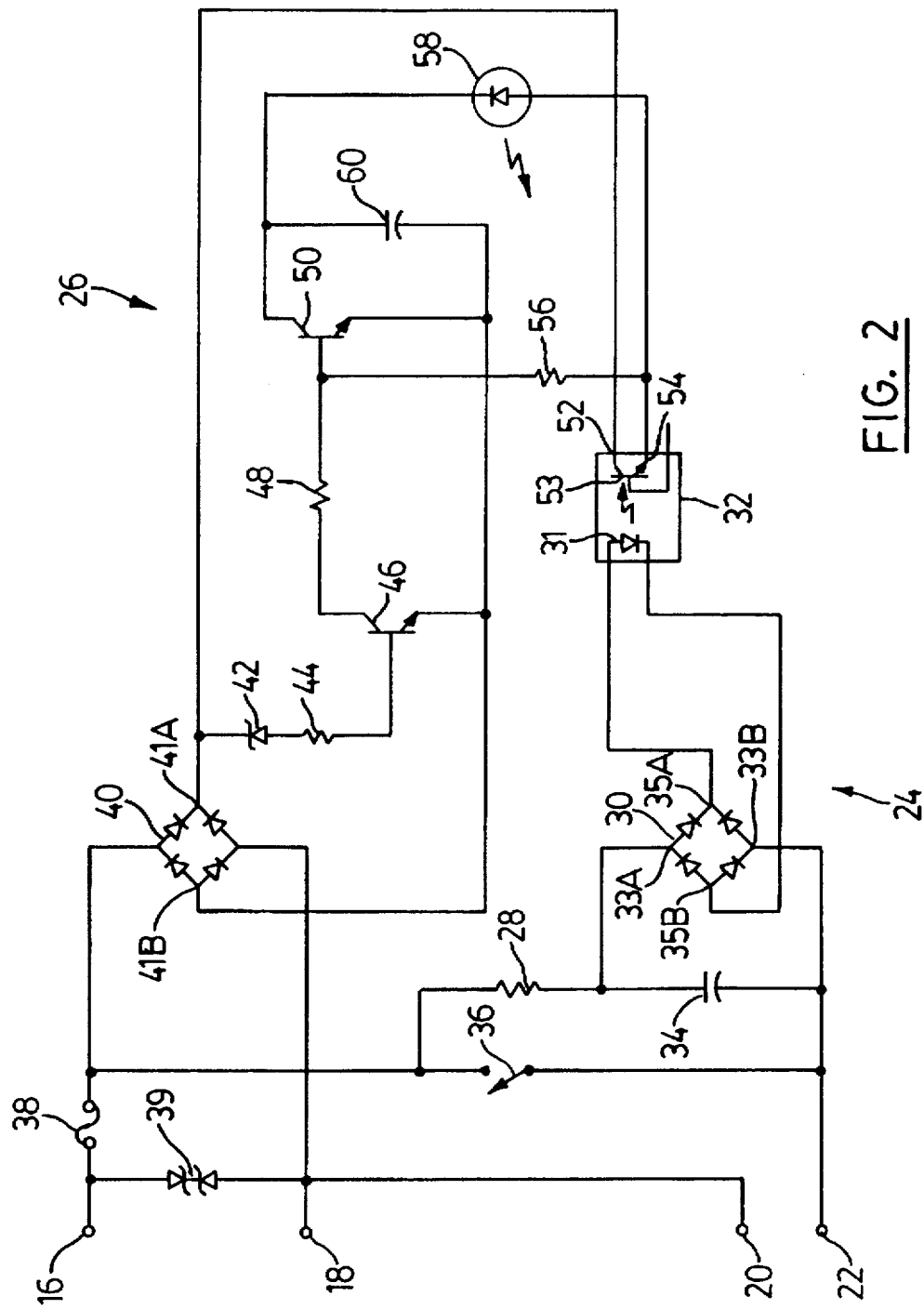
FIG. 2 is a circuit diagram of a preferred embodiment of the circuit of the alerting device.

FIG. 2 is a circuit diagram of a first preferred embodiment of the alerting device 10. Two terminals 16 and 18 are provided for connecting the circuit to the tip and ring conductors of the telephone line 14. The circuit of FIG. 2 can be broken down into two parallel circuits which are attached between the tip and ring terminals 16 and 18, namely a voice circuit, which is indicated generally by 24, and a monitoring circuit, which is indicated generally by 26.

The voice circuit 24 includes two terminals 20 and 22 for attaching a telephone device to the alerting device 10. One phone terminal 20 is connected directly to one phone line terminal 18. Two alternative current paths are provided between the other phone line terminal 16 and the other phone terminal 22. The first current path is provided by a resistor 28, a diode bridge rectifier 30 and the LED 31 of an opto-isolator 32. The resistor is connected between the terminal 16 and one AC junction 33A of the diode bridge 30. The other AC junction 33B of the diode bridge 30 is connected to the terminal 22. The LED 31 of the opto-isolator 32 is connected across the DC junctions 35A and 35B of the diode bridge 30. The diode bridge 30 serves as a polarizing circuit which ensures that current always flows in the correct direction to the LED 31 without concern for the polarization of the telephone line 14.

A capacitor 34 is connected across the AC junctions 33A and 33B of the diode bridge 30 to provide an AC signal path to the telephone device attached between the terminals 16 and 18. The capacitor 34 allows an AC ringing signal (typically 90 volts AC), along with other data such as caller ID data which may be superimposed on the ringing signal, to be provided to a telephone device connected to the terminals 20 and 22. In the preferred embodiment, the capacitor 34 is a 0.47 micro farad capacitor.

The second current path provided between the terminals 16 and 22 comprises a manual switch 36. When closed, the switch 36 provides a direct path between the terminals 16 and 22 thereby allowing the resistor 28, diode bridge 30 and LED 31 to be by-passed. For reasons which will become apparent hereinafter, when the switch 36 is open, the alerting device 10 is in an "enabled" state, and when the switch 36 is closed, the alerting device 10 is in an "disabled" state.

Although not required, a fuse 38 may be included in series with the terminal 16 as a safety feature. In the preferred embodiment, the fuse 38 is a 250 mA fuse. Additionally, an over-voltage protector 39 may be connected between the terminals 16 and 18 if desired.

The monitoring circuit 26 is coupled between the tip and ring terminals 16 and 18 via a diode bridge 40. The diode bridge 40 serves as a polarizing circuit such that current will flow in the same direction through the monitoring circuit 26 regardless of the polarization of the telephone line 14.

The monitoring circuit 26 includes a Zener diode 42, the cathode of which is attached to the positive DC junction 41A of the diode bridge 40, and the anode of which is connected, via a current limiting resistor 44, to the base of a first transistor 46. When the potential across the terminals 16 and 18 exceeds the Zener voltage threshold of the Zener diode 42, the Zener diode 42 will breakdown and conduct current to the base of the first transistor 46. In the preferred embodiment, the Zener diode 42 has a breakdown threshold of 10 volts, although different Zener diodes with different thresholds may be desirable depending on the characteristics of the telephone system the circuit is used in. The current limiting resistor 44 which is placed in series with the Zener diode 42 is of relatively high resistance, preferably around one (1) megaohm. The emitter of the first transistor 46 is connected to the negative DC terminal 41B of the diode bridge 40.

In addition to being connected to the Zener diode 42, the DC junction 41A of the diode bridge 40 is also connected to the collector 52 of the phototransistor 53 of the opto-isolator 32. The emitter 54 of the phototransistor 53 is connected, through a further current limiting resistor 56, to the base of a second transistor 50. The base of the second transistor 50 is also connected, via a resistor 48, to the collector of the first transistor 46. The magnitude of the resistor 48 is such that as long as the first transistor 46 is "on", then the potential at the base of the second transistor 50 will be insufficient to turn the second transistor 50 on. In the preferred embodiment the resistor 48 is a 1 kilohm resistor, and the resistor 56 has a resistance of between 270 kiliohm and one (1) megaohm. The emitter of the second transistor 50 is connected, along with the emitter of the first transistor 46, to the junction 41B of the diode bridge 40.

The monitoring circuit 26 also includes an LED 58 which is connected between the emitter 54 of the phototransistor 53 of the opto-isolator 32 and the collector of the second transistor 50. The LED 58 is preferably a special low current blinking LED. As will be explained in greater detail below, the blinking LED 58 is an alarm device used to signal an alarm state by generating both visible and audible alarms when the phone connected between the terminals 20 and 22 is off-hook and a further phone device connected to the same phone line also goes off-hook.

A capacitor 60 is preferably connected between the collector and emitter of the second transistor 50 in order to increase the stability of the circuit 26 by reducing spurious pulses or oscillations that may occur in the circuit 26. In the preferred embodiment, the capacitor 16 is a 1 micro farad capacitor.

With reference to FIGS. 1 and 2, the operation of a preferred embodiment of the alerting device 10 will now be described. In particular, the operation of the alerting device 10 will be described in three different situations. First, its operation will be described when all of the telephone devices 12A, 12B and 12C that are attached to the common telephone line 14 are on-hook. Next, its operation will be described when only the telephone device 12A is off-hook, and all the other telephone devices attached to the line 14 are on-hook. Finally, the operation of the alerting device 10 will be described when the telephone device 12A is off-hook and a further telephone device 12B or 12C is also off-hook.

When all of the telephone devices attached to the common telephone line 14 are in an on-hook state, the alerting device 10 is in a "standby-state". The normal on-hook line voltage of a typical telephone line is equal to the DC voltage applied to the line at the telephone exchange, generally around 48 volts DC. Thus, the line voltage $V_L$ between the tip and ring terminals 16 and 18 will generally be around 48 volts DC when the alerting device 10 is in its standby-state. When the telephone 12A is on-hook, no current path is provided between the terminals 20 and 22 with result that there is no current flow through the voice circuit 24.

In the monitoring circuit 26 the potential between the DC junctions 41A and 41B of the diode bridge 40 is equal to the potential $V_L$ between the tip and ring terminals 16 and 18, which, as described above, is around 48 volts DC when all the phone devices are on-hook. Because there is no current flow in the voice circuit 24 when the phone 12A is on-hook, the LED 31 of the opto-isolator 32 remains inactive, and so the phototransistor 53 stays in an off-state and no current is transmitted between its collector 52 and emitter 54. As a result, no potential exists at the anode of the blinking LED 58 or at the base of the second transistor 50, and so no current flows through the LED 58, regardless of the state of the first transistor 46. The first transistor 46 will actually be in an on-state when the line potential $V_L$ at the terminals 16 and 18 is 48 volts, as the Zener breakdown voltage of the Zener diode 42 is less than 48 volts. The high resistance of the current limiting resistor 44 ensures that the monitoring circuit 26 has a high DC impedance (of at least one (1) megaohm) when it is in a standby-state, which keeps the current draw of the monitoring circuit 26 at negligible levels and ensures the alerting device 10 is in compliance with FCC requirements.

The operation of the circuit of FIG. 2 will now be considered in the situation where the telephone 12A connected between the terminals 20 and 22 is taken off-hook, and the remaining telephone devices 12B and 12C connected to the common telephone line 14 remain on-hook. When the telephone 12A is taken off-hook, a circuit path between the terminals 20 and 22 is completed, and current begins to flow through the voice circuit 24. Provided that the manual switch 36 is in an open position (i.e., if the alerting device 10 is enabled) then current will flow through a path provided by the resistor 28, the diode bridge 30 and the LED 31 of the opto-isolator 32. The 48 volts DC potential applied across the telephone line at the telephone exchange will be divided between the line impedances $R_L$ and the total impedance of the circuit connected between the terminals 16 and 18. The impedance of the circuit connected between the terminal 16 and 18 is approximately the equivalent of the series combination of the resistor 28 and the internal impedance of the telephone 12A. (Because of the high resistance value of the resistor 44, the monitoring circuit 26 has a negligible affect on the total impedance of the circuit connected between the terminal 16 and 18 when the Zener diode 42 is reverse biased.)

In the preferred embodiment, when the telephone 12A is off-hook and the other telephone devices are on-hook, the voltage drop $V_L$ across the tip and ring terminals 16 and 18 will typically be in the range of $V_L$=10 to 16 volts, depending on the actual characteristics of the telephone line 14 and the telephone 12A. It will be appreciated by those skilled in the art that the presence of the current-limiting resistor 28 in series with the telephone 12A drives the line voltage $V_L$ across the terminals 16 and 18 higher than it would be if the telephone 12A was connected directly to the telephone line 14. For example, if the telephone 12A was connected directly to the telephone line 14, the voltage drop across the telephone 12A would nominally be about 6 volts (and typically in the range of 5 to 12 volts). In the preferred embodiment of FIG. 2, the resistor 28 is a 200 ohm resistor, although different values of resistors could be used depending on the characteristics of the line impedance $R_L$ and the telephone device 12A. As will be described in greater detail below, the resistor 28 can be replaced with a potentiometer.

Turning now to the monitoring circuit 26, when the telephone 12A alone is off-hook, the Zener diode 42 will supply current to the base of the first transistor 46 because the line voltage $V_L$ across the tip and ring terminals 16 and 18 will be in the approximate range of 10V to 16V, which is greater than the threshold voltage of the Zener diode 42. The flow of current through the voice circuit 24 causes the LED 31 of the opto-isolator 32 to place the phototransistor 53 in an on-state such that a current path is provided from the junction 41A of the diode bridge 40 to the base of the second transistor 50 and the anode of the blinking LED 58. However, as long as the first transistor 46 is in an on-state, the potential at the base of the second transistor 50 will be insufficient to place that transistor in an on-state, with the result that current will not be able to flow through the blinking LED 58 and the monitoring circuit 26 will not indicate an alarm state.

The situation will now be considered where the telephone 12A is in an off-hook state and a second telephone device 12B or 12C is also off-hook. When a second telephone device goes off-hook in addition to the telephone 12A, the line voltage $V_L$ between the terminals 16 and 18 will drop significantly because the combination of the alerting device 10 and the telephone 12A in parallel with a further telephone device 12B or 12C results in an overall lower impedance, and thus a greater proportion of the 48 volt drop in the system is attributed to the line impedances $R_L$. Typically, the line voltage $V_L$ across the terminals 16 and 18 will drop down to around 3 to 6 volts when more than one telephone device on the line 14 is off-hook, which is lower than the Zener threshold voltage of the Zener diode 42. As a result, the Zener diode 42 ceases conducting current to the base of the first transistor 46, which places the first transistor 46 in an off-state. The loss of a current path through the first transistor 46 causes an increase in the potential at the base of the second transistor 50 which is sufficient enough to place the second transistor 50 in an on-state, which in turn provides a path for current to flow through the blinking LED 58. As explained above the LED 58 is a special low current blinking diode which blinks on and off intermittently when current is supplied to it, thus providing an active visual alarm to the user of the telephone 12A that a further telephone device has been taken off-hook.

The blinking action of the LED 58 is a result of an internal capacitor in the LED 58 which is continually charging and discharging when current is supplied to it. Although the current flowing through the monitoring circuit 26 is quite small because the LED 58 is a low current LED and the value of the resistor 56 is relatively large, the change in current caused by the cyclic charging and discharging of the internal capacitor in the LED 58 is significant enough to affect the voice signal on the telephone line 14 by causing a periodic audible "click" to occur in the earpieces of all off-hook phone devices attached to the telephone line 14, and also in the ear piece of the phone device on the other side of the telephone exchange. In other words, the small current draw by the blinking LED 58 is sufficient enough to momentarily cause a small drop in the current in the voice circuit 24 and the telephone line 14. The "click" coincides with the blinking of the LED 58, and each "click" is of such a short duration and limited volume that, although audible, the "clicks" will generally not block out the voice signals being transmitted on the telephone line 14. Thus, the circuit of FIG. 2 provides an audio alarm in addition to a visual alarm. Furthermore, as the audio alarm can be heard in the earpieces of all off-hook telephones, including the phone on the other side of the telephone exchange, all participants are aware that a potential eavesdropper is on the line, and that the eavesdropper has been detected. Additionally, the audio alarm and visual alarms are powered by the telephone-line without requiring an additional external source of power.

As explained above, the circuit of FIG. 2 includes a manual enabling/disabling switch 36. When the switch 36 is open the circuit operates in the manner described above. However, when the switch 36 is closed a current path is provided directly between the terminal 16 and 22 thereby allowing current to bypass the resistor 28, the diode bridge 30 and LED 31 of the voice circuit 24. As a result, the monitoring circuit 26 is effectively disabled as the phototransistor 53 will not conduct between its emitter 52 and collector 54 as long as no current passes through the LED 31. Thus, a user who wants to temporarily disable the alerting function of device 10 can do so by closing the switch 36.

From the above description, it will be apparent that the opto-isolator 32 couples the voice circuit 24 and the monitoring circuit 26 such that when no current flows through the diode bridge 30 and the LED 31 of the voice circuit 24, the monitoring circuit 26 will not be able to activate the blinking LED 58. Current will not flow through the diode bridge 30 and the LED 31 if the switch 36 is closed, or if the telephone 12A is on-hook. The fact that the alerting function of the monitoring circuit 26 is effectively disabled when the phone 12A is on-hook ensures that the circuit 26 will not be triggered by other phone devices 12B or 12C going off-hook (either alone or together) when the phone 12A is on-hook.

In effect, when enabled, the circuit of FIG. 2 monitors whether current is passing through the telephone 12A and whether the line voltage $V_L$ across the telephone line 14 drops below a threshold value. The LED 31 of the voice circuit 24 indicates when current is passing through the telephone 12A, and the Zener diode 42 indicates (by blocking current) when the voltage across the telephone line 14 has dropped below the threshold value. If current is passing through the telephone 12A (which occurs when the telephone 12A is off-hook) and the line voltage $V_L$ drops below the threshold value (which occurs when telephone devices 12B or 12C go off-hook) at the same time, then the circuit of FIG. 2 generates an alarm by providing current to the blinking LED 58 in the manner described above.

It will thus be appreciated that the circuit of FIG. 2 provides an eavesdropping alarm which only needs to be attached to one telephone on a common line and which generates a visual alarm and also an audio alarm when another telephone device on the common line is off-hook. The audio alarm is heard in the ear-pieces of all off-hook phones, however it does not cut off the user of the first telephone. Furthermore, the circuit of FIG. 2 is relatively cheap and easy to construct and does not require an external power source other than the telephone line.

The resistor 28 of the voice circuit 24 that is placed in series with the telephone 12A is an important aspect of the invention as it ensures that a significant change in the line voltage $V_L$ occurs between the situation where the telephone 12A is the only off-hook device on the telephone line 14 and the situation where the telephone 12A and other telephone devices 12B and/or 12C are also off-hook. The significant change in line voltage between these two situations permits the construction of a robust and accurate alerting device 10 which can be used in a variety of telephone systems with differing characteristics.

Figure 3:
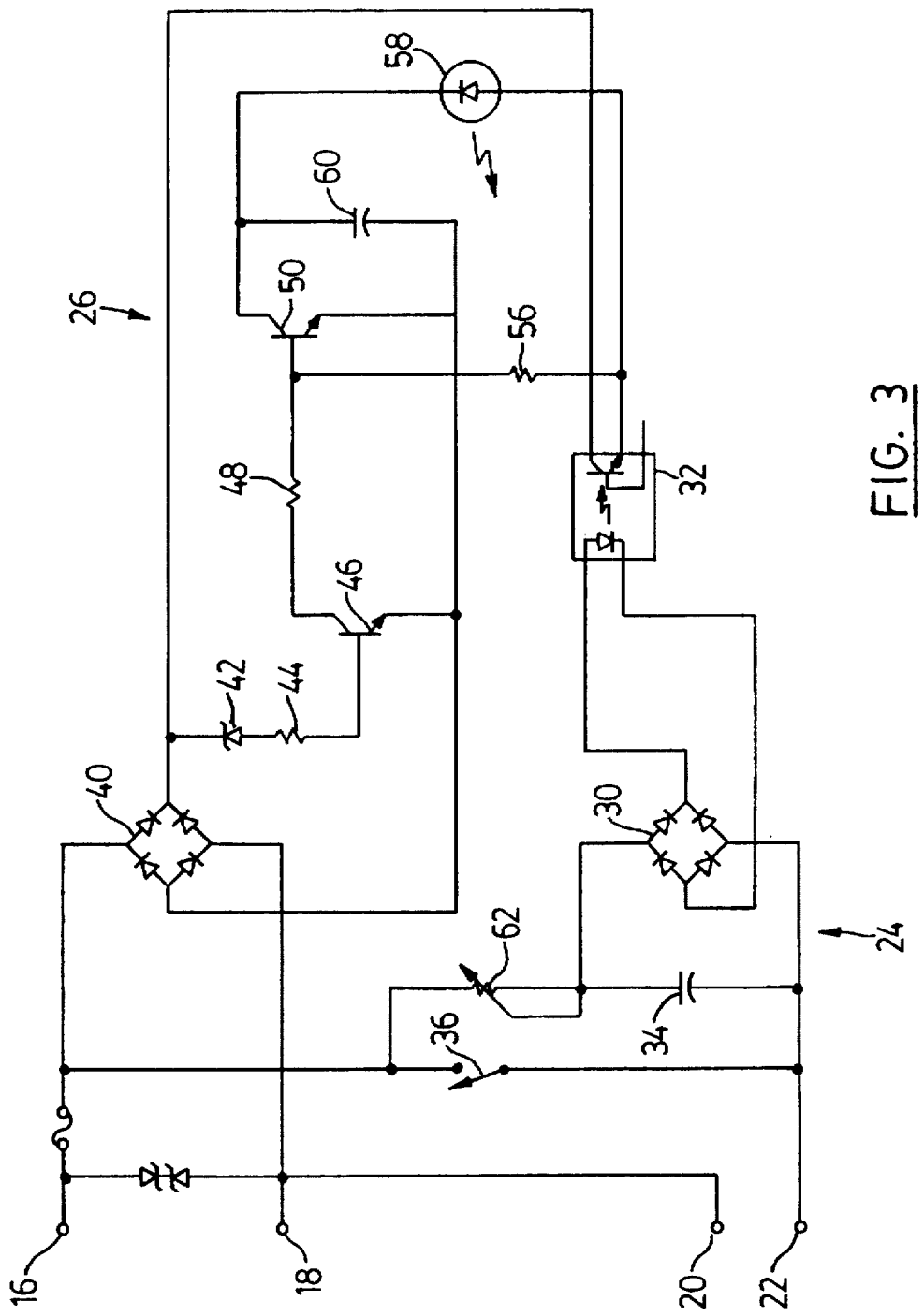
FIG. 3 is a circuit diagram of another preferred embodiment of the circuit of the alerting device.

Although the circuit of FIG. 2 will function well in most telephone systems, it is possible that in some phone systems the telephone line impedances and the characteristics of the phone devices attached to the phone line will require that a different value be used for the resistor 28. FIG. 3 illustrates a second preferred embodiment of the circuit of the alerting device 10. The circuit of FIG. 3 is identical in function and structure to the circuit of FIG. 2 described above except that the resistor 28 has been replaced with a potentiometer 62. The potentiometer 62 is preferably adjustable from 0 to 500 ohms and permits the circuit of FIG. 3 to be easily adjusted for use with a wide range of telephone systems with differing characteristics.

Figure 4:
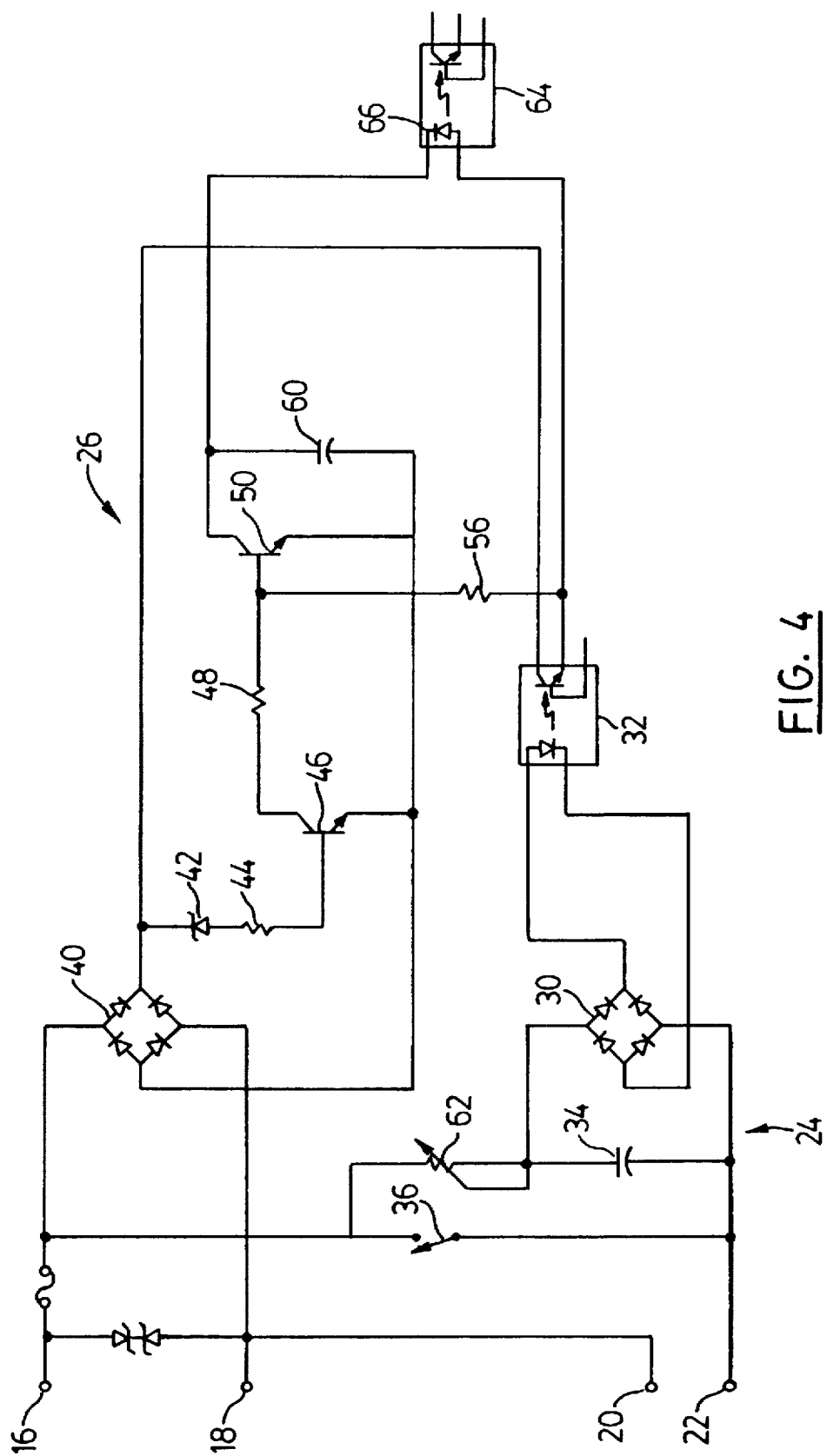
FIG. 4 is a circuit diagram of a further preferred embodiment of the circuit of the alerting device.

Although a blinking LED is used in the circuits of FIG. 2 and FIG. 3 as the alarm means for indicating that a second phone is off-hook, it will be appreciated that the blinking LED 58 could be replaced with some other alarm indicating means. For example, with reference to FIG. 4, the blinking LED could be replaced with an opto-isolator, which in turn could be used to drive an alarm device such as an external audio buzzer (not shown). The embodiment of the invention illustrated in FIG. 4 is identical in both structure and function to the circuit of FIG. 3, except that the blinking LED 58 has been replaced with an LED 66 of an opto-isolator 64.

The alerting device 10 can be produced and sold as a stand alone device that can be attached between a telephone device and a telephone jack, or it can be produced and sold integrally combined with a telephone device.

As will be apparent to those skilled in the art in the light of the foregoing disclosure, many alterations and modifications are possible in the practice of this invention without departing from the spirit or scope thereof. Accordingly, the scope of the invention is to be construed in accordance with the substance defined by the following claims.

What is claimed is:

1. An alerting device for connection to a telephone line and a telephone device, said alerting device comprising:
    a voice circuit for connection between the telephone line and the telephone device, said voice circuit including a current limiting resistor for series connection between the telephone device and the telephone line;
    an alarm circuit for generating an alarm;
    a current monitoring circuit connected to said voice circuit for detecting the presence of current in said voice circuit, said current monitoring circuit being operatively connected to said alarm circuit for providing a first triggering signal to said alarm circuit when current is present in said voice circuit; and
    a voltage monitoring circuit for connection to said telephone line for detecting when the voltage across said telephone line drops below a threshold value, said voltage monitoring circuit being operatively connected to said alarm circuit for providing a second triggering signal to said alarm circuit when said voltage is below said threshold value,
    wherein said alarm circuit will generate said alarm when it receives said first triggering signal and said second triggering signal simultaneously.

2. An alerting device according to claim 1, wherein said threshold value is less than the voltage across the telephone line when the telephone device is off-hook and no other telephone devices connected to the telephone line are off-hook, and said threshold value is higher than the voltage across the telephone line when the telephone device is off-hook and at least one other telephone device connected to the telephone line is also off-hook.

3. An alerting device according to claim 1 further including a disabling switch circuit for manually disabling said current monitoring circuit so that it will not provide said first triggering signal to said alarm circuit.

4. An alerting device according to claim 1, wherein said voltage monitoring circuit comprises a series combination of a Zener diode and a resistor connected between the telephone line and said alarm circuit, said Zener diode providing said second triggering signal by not passing current to said alarm circuit when the voltage across the telephone line is below said threshold.

5. An alerting device according to claim 4, wherein said current monitoring circuit comprises an LED of an opto-isolator, and a diode bridge rectifier, said LED being coupled in series with said resistor in said voice circuit by said diode bridge rectifier, said LED providing said first triggering signal by generating light when current passes through it.

6. An alerting device according to claim 5, wherein said alarm circuit comprises a first transistor, a phototransistor of said opto-isolator, a second transistor, and an alarm device, the base of said first transistor being connected to said series combination of said Zener diode and said resistor such that said first transistor will be turned off when said second triggering signal is provided to said alarm circuit, said phototransistor being optically linked to said LED such that said phototransistor will be turned on when said alarm circuit receives said first triggering signal, the base of said second transistor being electrically connected to said phototransistor and to said first transistor such that the potential at the base of said second transistor will be sufficient to turn said second transistor on only when said first transistor is off and said phototransistor is on, said alarm device being connected to said second transistor such that current is provided to said alarm device when said second transistor is on.

7. An alerting device according to claim 6, wherein said alarm device is a low current blinking LED which oscillates between on and off states when current is provided to it.

8. An alerting device according to claim 7, wherein the oscillation of said blinking LED between on and off states results in an periodic signal of short duration being placed on said telephone line that generates an audible sound in the earpieces of all off-hook telephone devices attached to said telephone line and also in the ear-piece of an off-hook telephone device connected to the telephone line through a telephone exchange.

9. An alerting device for connection to a telephone line having tip and ring lines and a telephone device, the alerting device comprising:

a voice circuit for connection between the telephone line and the telephone device, said voice circuit including indicating means for indicating when a current is passing through said voice circuit and current limiting means for limiting the current through said voice circuit;

a monitoring circuit comprising telephone line monitoring means for detecting when the potential across said telephone line drops below a predetermined value; voice circuit monitoring means responsive to said indicating means for detecting when a current is passing through said voice circuit; and an alarm means for indicating an alarm when said line monitoring means detects that said potential is below said predetermined value and said voice circuit monitoring means detects that current is passing through said voice circuit;

coupling means for coupling said monitoring circuit between said tip and ring lines.

10. An alerting device according to claim 9 wherein said coupling means comprises a first diode bridge rectifier having two AC junctions, a positive DC junction and a negative DC junction, the AC junctions being connected between the tip and ring lines.

11. An alerting device according to claim 10 wherein said telephone line monitoring means comprises a Zener diode, a resistor and a first transistor, a cathode of said Zener diode being electrically connected to the positive DC junction of said first diode bridge and an anode of said Zener diode being connected through said resistor to a base of said first transistor, an emitter of said transistor being connected to the negative DC junction of said first diode bridge.

12. An alerting device according to claim 11 wherein said indicating means comprises an LED of an opto-isolator and a further diode bridge rectifier, said LED being connected through said diode bridge to said voice circuit.

13. An alerting device according to claim 12 wherein said voice circuit monitoring means comprises a phototransistor of said opto-isolator, the collector of said phototransistor being electrically connected to the positive DC junction of said first diode bridge.

14. An alerting device according to claim 13 wherein said alarm means comprises a second transistor, a first resistor, a second resistor and a further LED, a base of said second transistor being electrically connected through said first resistor to an emitter of said phototransistor, said base of said second transistor also being electrically connected through said second resistor to a collector of said first transistor, an emitter of said second transistor being connected to the negative DC junction of said first diode bridge, an anode of said further LED being connected to the emitter of said phototransistor, a cathode of said further LED being connected to a collector of said second transistor.

15. An alerting device according to claim 9 wherein said current limiting means is a potentiometer.

16. An alerting device for connection to a telephone line and a telephone device, the alerting device comprising:

a voice circuit for connection between the telephone line and the telephone device;

an alarm circuit for generating a signal on said telephone line that causes an audio sound to be generated by the ear-pieces of the telephone device and other off-hook telephone devices connected to the telephone line;

a current monitoring circuit connected to said voice circuit for detecting the presence of current in said voice circuit, said current monitoring circuit being operatively connected to said alarm circuit for providing a first triggering signal to said alarm circuit when current is present in said voice circuit; and a voltage monitoring circuit for connection to said telephone line for detecting when the voltage across said telephone line drops below a threshold level, said voltage monitoring circuit being operatively connected to said alarm circuit for providing a second triggering signal to said alarm circuit when said voltage is below said threshold, wherein said alarm circuit will generate said signal only when it receives said first triggering signal and said second triggering signal simultaneously.

17. An alerting device according to claim 16 wherein said alarm circuit includes a low current blinking LED.

18. An alerting device according to claim 16 further including a current limiting resistor in said voice circuit for raising the voltage across the telephone line when the telephone device is off-hook and no other telephone devices connected to the telephone line are off-hook.

19. An alerting device according to claim 16 further including a disabling circuit connected to said voice circuit for disabling said current monitoring circuit so that said current monitoring circuit will not provide said first triggering signal to said alarm circuit.

20. An alerting device according to claim 17 wherein said current monitoring circuit is optically isolated from said alarm circuit.

* * * * *